United States Patent [19]

Smith

[11] 3,992,979

[45] Nov. 23, 1976

[54] HYDRAULIC ACTUATING ARRANGEMENTS

[75] Inventor: Charles Philip Smith, Wolverhampton, England

[73] Assignee: Joseph Lucas (Industries) Limited, Birmingham, England

[22] Filed: Dec. 20, 1974

[21] Appl. No.: 534,892

[52] U.S. Cl. .................................. 91/413; 91/411 A; 91/465; 244/78

[51] Int. Cl.² ...................... F15B 11/16; B64C 13/42

[58] Field of Search ............ 244/78; 91/411 A, 413, 91/464, 462, 465, 463; 137/569, 115

[56] References Cited

UNITED STATES PATENTS

| | | | |
|---|---|---|---|
| 1,279,027 | 9/1918 | Simmon et al. | 91/465 |
| 2,401,680 | 6/1946 | Eaton | 91/464 X |
| 2,637,341 | 5/1953 | Borst | 91/464 X |
| 2,741,895 | 4/1956 | Horvath | 91/464 X |
| 3,272,062 | 9/1966 | Flippo et al. | 91/411 A X |
| 3,338,139 | 8/1967 | Wood | 91/411 A X |
| 3,460,440 | 8/1969 | Brent | 91/464 X |
| 3,470,692 | 10/1969 | Kamp | 91/465 |

*Primary Examiner*—Trygve M. Blix
*Assistant Examiner*—Galen L. Barefoot

[57] ABSTRACT

A hydraulic actuator arrangement has a pair of double acting actuator devices coupled together for movement in unison. Each device has two control valves respectively operable to cause the device to move in opposite directions. The four control valves are resiliently coupled so that both actuator devices are normally energised simultaneously. Each control valve has an associated pressure relief valve so that failure of any one of the control valves permits the pressures on either side of the associated actuator device to be equalized.

6 Claims, 2 Drawing Figures

HYDRAULIC ACTUATING ARRANGEMENTS

This invention relates to hydraulic actuating arrangements, and in particular to such arrangements for use in control systems for aircraft.

It is known, in actuator arrangements for aircraft controls, to provide duplication of certain elements, for example control valves, whereby the arrangement continues to function in spite of the malfunction of one of the elements.

It has been proposed to provide an actuator arrangement of the kind having a double-acting piston and two control valves by means of which a pressure signal can be applied to a selected side of the piston.

In known forms of such arrangements, the control valves are hydraulically interconnected so that, in normal operation, a proportion of a pressure and return flow for the piston passes through each valve. The valves are linked for differential movement by an input member so that in the event of a control element of one of the valves failing to move by a required amount, the control element of the other valve moves by a correspondingly greater amount, thereby providing a compensated rate of flow to and from the piston. The speed of piston movement, for a given movement of the input member, thus remains substantially constant.

It is a disadvantage of such known arrangements that, in certain conditions of malfunction, the pressure and return connections to one of the valves may be interconnected via the other of the valves, effectively bypassing the actuator arrangement.

It is accordingly an object of the invention to provide an actuator arrangement of the foregoing kind, in which the control valves are not hydraulically interconnected.

According to the invention a hydraulic actuator arrangement comprises a pair of double-acting actuator devices, said actuator devices being interconnected for movement in unison, first and second control valves having control elements which are respectively operable to provide first and second pressure signals to drive one of said actuator devices in respective opposite directions, third and fourth control valves having control elements which are respectively operable to provide third and fourth pressure signals to drive the other of said actuator devices in respective opposite directions, and means resiliently coacting with said control elements for moving the latter in unison.

An example of the invention will now be described with reference to the accompanying drawings, in which.

Figure 1:
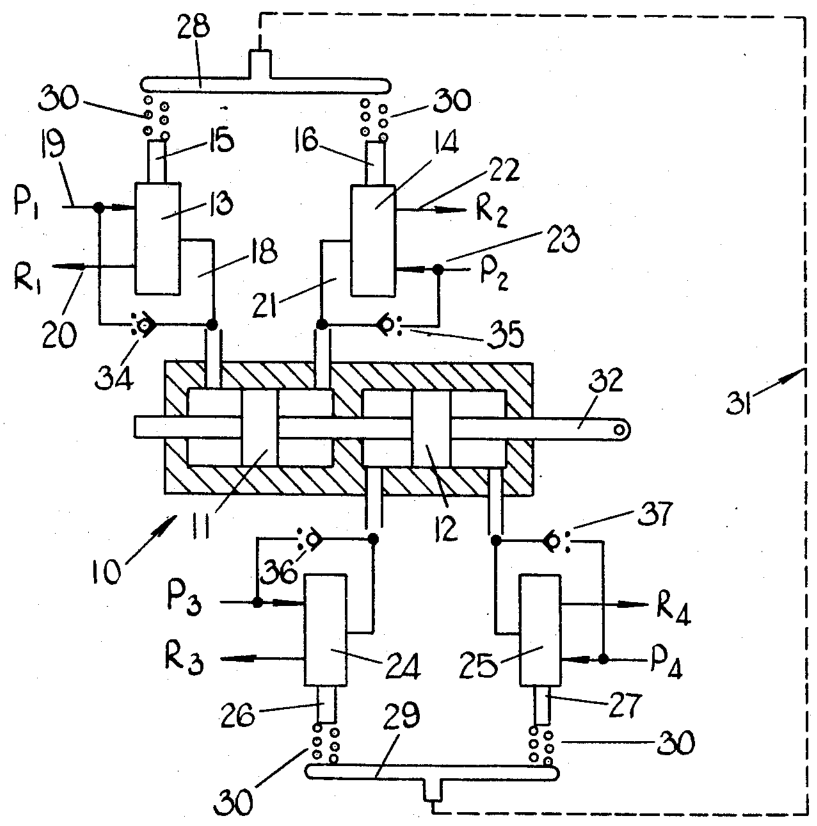
FIG. 1 shows, diagrammatically, an actuator arrangement.
Figure 2:
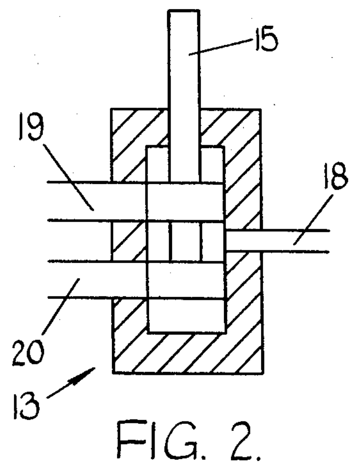
FIG. 2 is a diagram of a control valve forming part of the arrangement of FIG. 1.

The arrangement shown includes an actuator device 10, comprising two double-acting piston and cylinder units, the pistons 11, 12 of which are, as shown, axially aligned and connected together. Two spool-type control valves 13, 14 have respective control elements 15, 16. Valve 13 is shown diagrammatically in FIG. 2, from which it will be seen that the control element 15 is movable to apply to one side of piston 11, via a connection 18, either a hydraulic supply pressure $P_1$ in a line 19 or a return pressure $R_1$ in a line 20. The control element 15 has, as shown, a central position in which the connection 18 and lines 19, 20 are mutually isolated.

Valve 14 is generally similar to valve 13 and is operable to apply to the other side of piston 11, via a connection 21, either a supply pressure $P_2$ in a line 22 or a return pressure $R_2$ in a line 23. Pressure and return lines 22, 23 are connected to valve 14 so that, if control elements 15, 16 are moved in unison, application of a supply pressure to one side of piston 11 is accompanied by the application of a return pressure to the other side of piston 11. A relief valve 34 is connected between connection 18 and the pressure line 19, so as to permit flow from connection 18 when the pressure therein slightly exceeds pressure $P_1$. A relief valve 35 is similarly connected between connection 21 and pressure line 23.

Piston 12 has associated control valves 24, 25 with respective control elements 26, 27. Valves 24, 25 function in the same way as the corresponding valves 13, 14 to move piston 12 in response to supply pressures $P_3$ or $P_4$ and return pressures $R_3$ or $R_4$. Relief valves 36, 37 are also provided, corresponding in function to the aforementioned relief valves 34, 35. Pressures $P_1$, $P_2$, $P_3$, $P_4$ are equal, and may be derived from a common supply or from duplicated supplies. Pressures $R_1$, $R_2$, $R_3$, $R_4$ are also equal.

Control elements 15, 16 are connected via preloaded spring boxes, indicated at 30, to opposite ends of a bar 28, and elements 26, 27 are similarly connected to a bar 29. The mid-points of bar 28, 29 are engaged by a single input member, indicated at 31, as for example a shaft, on which are a pair of cam surfaces or cranks, so that the bars 28, 29 move in unison.

It will be seen that upward movement, as seen in the drawing, of control elements 15, 16, 26, 27 causes the left hand sides of pistons 11, 12 to be subjected to supply pressures $P_1$, $P_3$ respectively, and the right hand sides of pistons 11, 12 to be subjected to return pressures $R_2$, $R_4$ respectively. An output member 32 of the device 10 is thus moved to the right. Downward movement of the control elements moves output member 32 to the left.

If, for example, element 15 becomes jammed in its upward position, a subsequent downward movement of bars 28, 29 compresses the spring box 30 associated with element 15. Control elements 16, 26, 27 move downwardly to apply supply pressures to the right hand sides of pistons 11, 12 and to connect the left-hand side of piston 12 to a return pressure. Output member 32 remains stationary until the pressure difference across piston 11 exceeds the pressure difference across piston 12, when relief valve 34 opens and output member 32 moves to the left. Actuator device 10 thus operates under control of valves 14, 24, 25.

If element 15 becomes jammed in its downward position, the output member can be moved to the right under control of valves 24, 25.

Similarly a malfunction of one or both valves in either one of the pairs 13, 14 or 24, 25, enables the actuator device 10 to be controlled by the remaining, functional valves.

I claim:

1. A hydraulic actuator arrangement comprising a pair of double-acting actuator devices, said actuator devices being interconnected for movement in unison, first and second control valves each having independently movable control elements which are respectively operable to provide first and second pressure signals to drive one of said actuator devices in respective opposite directions, third and fourth control valves each having independently movable control elements which are respectively operable to drive the other of said actuator devices in respective opposite directions, means for moving said control elements, resilient means connecting said moving means with each of said control elements for normally moving the latter in unison, means for applying a supply pressure to said valves and four relief valves for preventing said first, second, third and fourth pressure signals respectively from exceeding said supply pressure by more than a predetermined amount.

2. An arrangement as claimed in claim 1 in which said actuator devices comprise a pair of double-acting piston and cylinder units.

3. An arrangement as claimed in claim 2 in which said piston and cylinder units are axially aligned.

4. An arrangement as claimed in claim 2 in which the pistons of said units are connected together.

5. An arrangement as claimed in claim 1 in which said means for moving the control elements in unison comprises a first lever member, resilient elements connecting opposite ends of said first lever member with the control elements of said first and second valves respectively, a second lever member, resilient element connecting opposite ends of said second lever member to the control elements of said third and fourth control valves respectively, and means for moving the midpoints of said lever members in unison.

6. An arrangement as claimed in claim 1 wherein each of said control valves has a first port for connection to a pressure source, a second port for connection to a return line and a third port connected to provide one of said pressure signals to one of said actuator devices, the control element of each said control valve being movable from a position in which said ports are mutually isolated, in respective opposite directions to connect said third port to said pressure source or to said return line.

* * * * *